US012548931B2

(12) United States Patent
Raybold

(10) Patent No.: US 12,548,931 B2
(45) Date of Patent: Feb. 10, 2026

(54) CONNECTOR SYSTEM FOR FLAT FLEXIBLE CABLES

(71) Applicant: TE Connectivity Solutions GmbH, Schaffhausen (CH)

(72) Inventor: Christopher R. Raybold, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 363 days.

(21) Appl. No.: 18/303,835

(22) Filed: Apr. 20, 2023

(65) Prior Publication Data

US 2024/0356259 A1 Oct. 24, 2024

(51) Int. Cl.

| | |
|---|---|
| ***H01R 12/79*** | (2011.01) |
| ***H01R 12/70*** | (2011.01) |
| ***H01R 13/436*** | (2006.01) |
| ***H01R 13/627*** | (2006.01) |

(52) U.S. Cl.

CPC ......... *H01R 12/79* (2013.01); *H01R 12/7005* (2013.01); *H01R 13/4365* (2013.01); *H01R 13/6271* (2013.01)

(58) Field of Classification Search

CPC ................ H01R 12/79; H01R 12/7005; H01R 13/4365; H01R 13/6271

USPC ......................................... 439/492, 493, 495

See application file for complete search history.

(56) References Cited

U.S. PATENT DOCUMENTS

| | | | | |
|---|---|---|---|---|
| 6,979,224 | B2 * | 12/2005 | Boemmel | H01R 12/592 439/492 |
| 7,044,772 | B2 * | 5/2006 | McCreery | H01R 12/675 439/493 |
| 2006/0035515 | A1 * | 2/2006 | Pabst | H01R 12/88 439/492 |
| 2007/0149042 | A1 * | 6/2007 | Yotsutani | H01R 13/6585 439/492 |
| 2009/0004910 | A1 * | 1/2009 | Takahira | H01R 12/79 439/495 |
| 2024/0079803 | A1 * | 3/2024 | Brantingham | H01R 12/592 |
| 2025/0158305 | A1 * | 5/2025 | Raybold | H01R 12/79 |

* cited by examiner

*Primary Examiner* — Hae Moon Hyeon

(57) ABSTRACT

A connector assembly for a flat flexible cable (FFC) includes a plug, an FFC, a cable stiffening element and a header. The plug retains a plurality of conductive terminals, each having a welding surface exposed on a first side of the plug, and a second contact surface exposed on a second side of the plug, opposite the first side. The FFC includes a plurality of conductors exposed on at least one side thereof. The cable stiffening element is arranged over the FFC proximate the plurality of exposed conductors, and is mounted to the plug such that the welding surfaces of the conductive terminals oppose the exposed conductors of the FFC. The header is adapted to be mounted to a substrate and defines a plug opening having a plurality of conductive header contacts arranged therein and adapted to receive the plug.

20 Claims, 10 Drawing Sheets

CONNECTOR SYSTEM FOR FLAT FLEXIBLE CABLES

FIELD OF THE INVENTION

The present invention relates to electrical connectors, and more particularly, to a connector assembly or system suitable for use with narrow-pitch flat flexible cables.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing. A critical obstacle preventing the implementation of FFCs into these applications includes the need to develop quick, robust, and low resistance termination techniques which enable the relatively fragile FFC to be mating with various components, including substrates such as printed circuit boards (PCBs). There is also a need for connectors which can be used with narrow-pitch FFCs (e.g., 1.25 mm FFCs), while still being able to withstand vibration, thermal cycling and other mechanical strength requirements for harsh environments (e.g., automotive applications).

Accordingly, improved, reliable solutions for terminating narrow-pitch FFC assemblies are desired.

SUMMARY

In one embodiment of the present disclosure, a connector assembly for a flat flexible cable (FFC) includes a plug, an FFC, a cable stiffening element and a header. The plug retains a plurality of conductive terminals, each having a welding surface exposed on a first side of the plug, and a second contact surface exposed on a second side of the plug, opposite the first side. The FFC includes a plurality of conductors exposed on at least one side thereof. The cable stiffening element is arranged over or affixed to the FFC proximate the plurality of exposed conductors, and is mounted to the plug such that the welding surfaces of the conductive terminals oppose the exposed conductors of the FFC. The header is adapted to be mounted to a substrate (e.g., a PCB) and defines a plug opening having a plurality of conductive header contacts arranged therein. The plug is connectable to the header within the plug opening with the second contact surfaces of the conductive terminals in conductive contact with respective ones of the plurality of header contacts.

BRIEF DESCRIPTION OF THE DRAWINGS

The invention will now be described by way of example with reference to the accompanying Figures, of which.

DETAILED DESCRIPTION OF THE EMBODIMENTS

Figure 1:
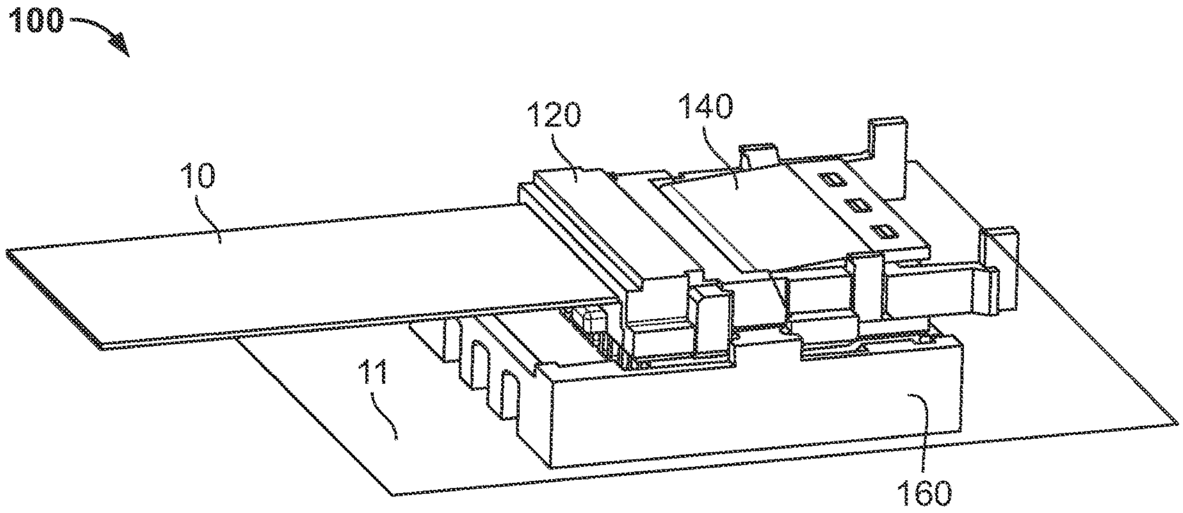
FIG. 1 is side perspective view of an FFC connector assembly according to an embodiment of the present disclosure in an initial alignment state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
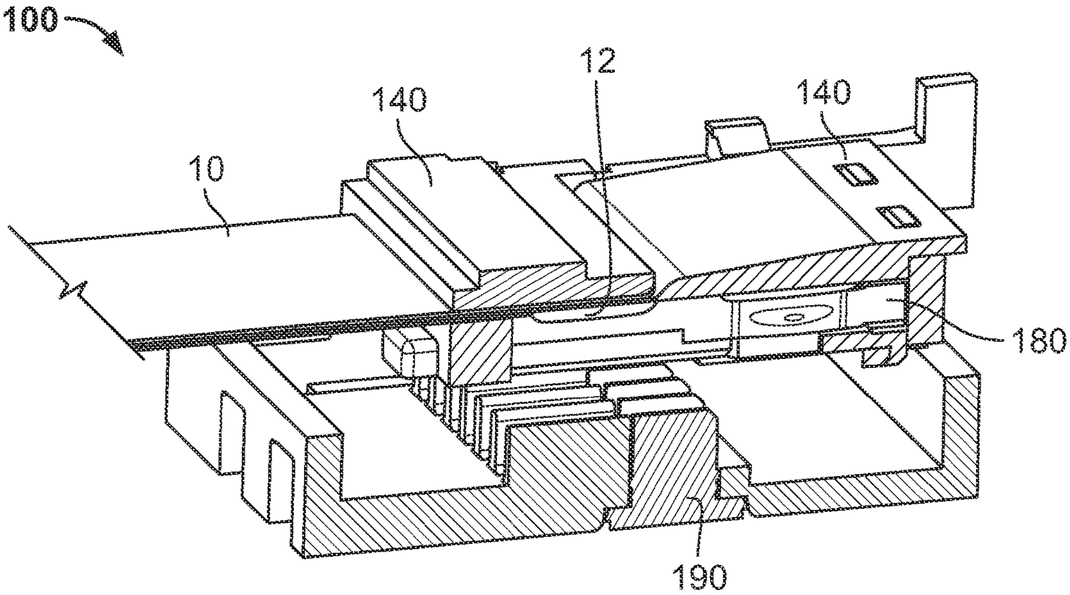
FIG. 2 is a cross-sectional view of the connector assembly of FIG. 1.
Figure 3:
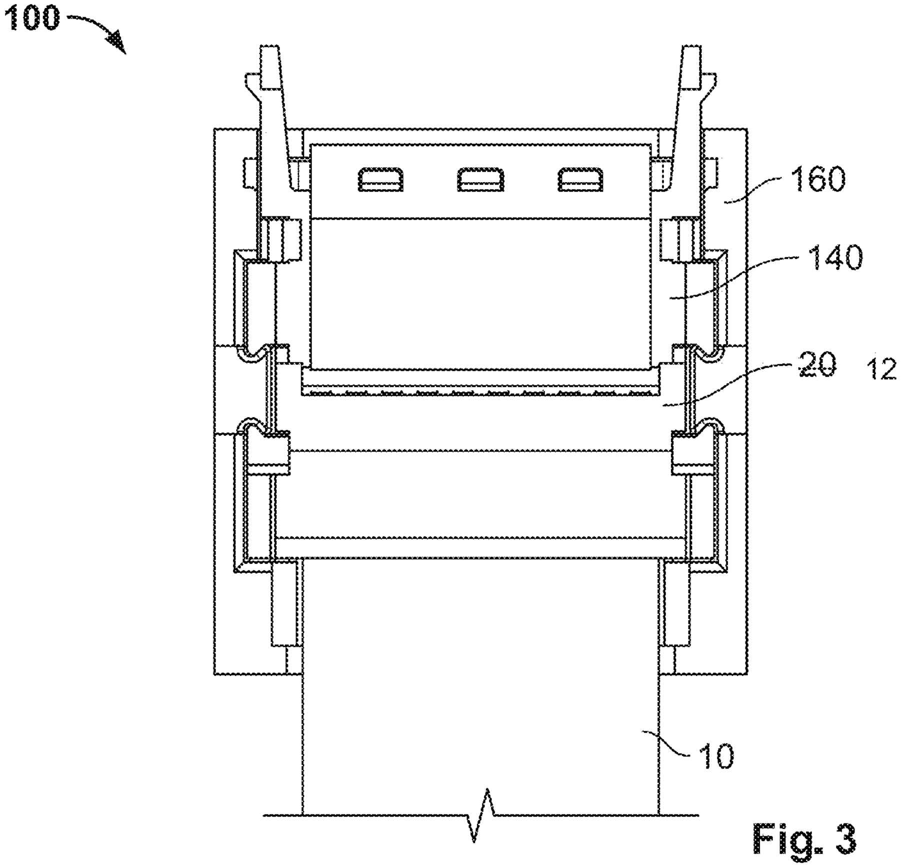
FIG. 3 is a top view of the connector assembly of FIG. 1.

FIGS. 1-3 generally show an exemplary FFC connector assembly 100 according to an embodiment of the present disclosure in an initial alignment state. The FFC connector assembly 100 is adapted to electrically connect a flat flexible cable (FFC) 10 to a substrate 11, such as a printed circuit board (PCB). The FFC connector assembly 100 includes a cable stiffening element or cable stiffener 120, a plug 140 and a header 160.

Figure 4:
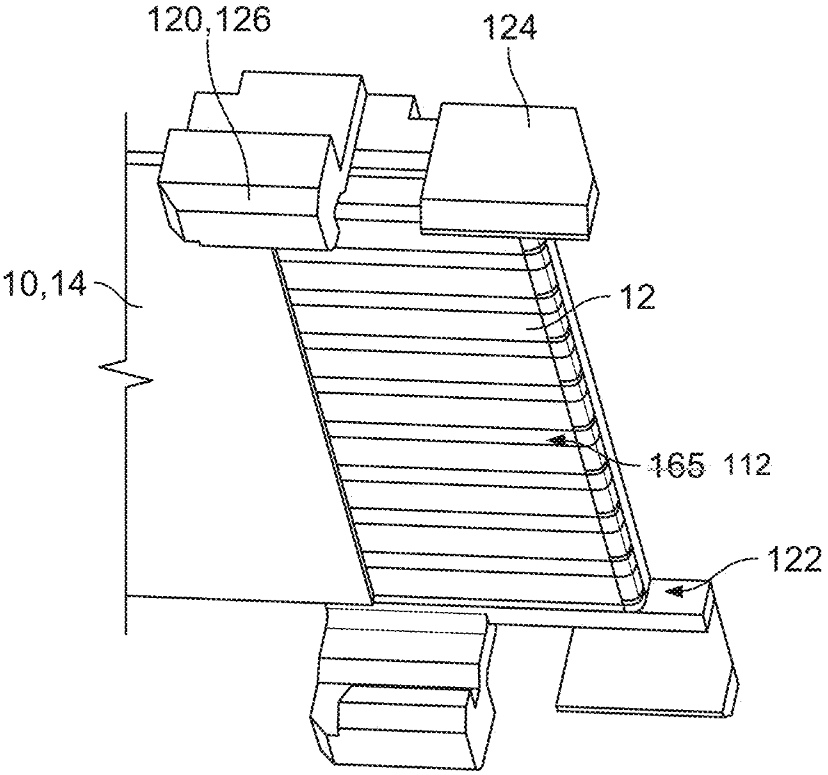
FIG. 4 is a bottom perspective view of a cable subassembly including an FFC and a cable stiffening element installed thereon.
Figure 5:
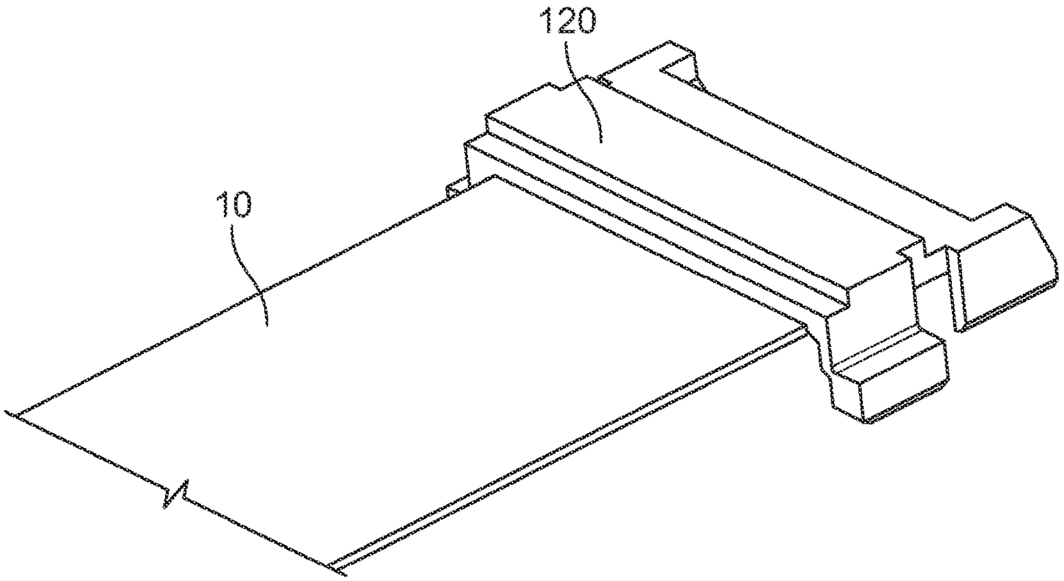
FIG. 5 is a top perspective view of the cable subassembly of FIG. 4.

A plurality of conductive terminals 180 are held within the plug 140, and are electrically connected to a corresponding plurality of conductors 12 of the FFC 10 (see also FIG. 4). In turn, each terminal 180 is connectable to a respective one of a plurality of conductive header tabs or contacts 190 arranged on or within the header 160 as the plug 140 is engaged with the header 160. Ends of each conductive header tab or contact 190 are exposed through a bottom of the header 160 such that they may be electrically connected to the substrate 11 or PCB (e.g., via soldering or welding to conductive traces or pads formed thereon). In the arrangement shown in FIGS. 1-3, the FFC connector assembly 100 is in an initial alignment position, wherein the a cable stiffening element or cable stiffener 120 and the plug 140 have not been mechanically or electrically engaged with or connected to the header 160.

As shown in FIG. 4, the cable stiffening element or cable stiffener 120 defines a slotted opening 122 sized to receive the FFC 10 therethrough, and a pair of guide protrusions 124 and latching arms 126 arranged on either lateral side thereof for fitting the cable stiffening element or cable stiffener 120 to the plug 140. The conductors 12 of the exemplary FFC 10 are embedded within an insulating material 14. The conductors 12 may comprise metallic sheet or foil, such as copper foil, by way of example only, patterned in any desirable configuration. The insulating material 14, such as a polymer insulating material, may be applied to either side of the conductors 12 via an adhesive, resulting in an embedded conductor arrangement. The insulation material 14 may be selectively removed, or not initially applied, in selective areas for exposing the conductors 12, such as in a window 112 on an underside of the exemplary illustrated FFC 10. The exposed portion of each of the conductors 12 is then connected (e.g., welded) to a respective terminal 180 held within the plug 140, as set forth in greater detail herein.

Figure 6:
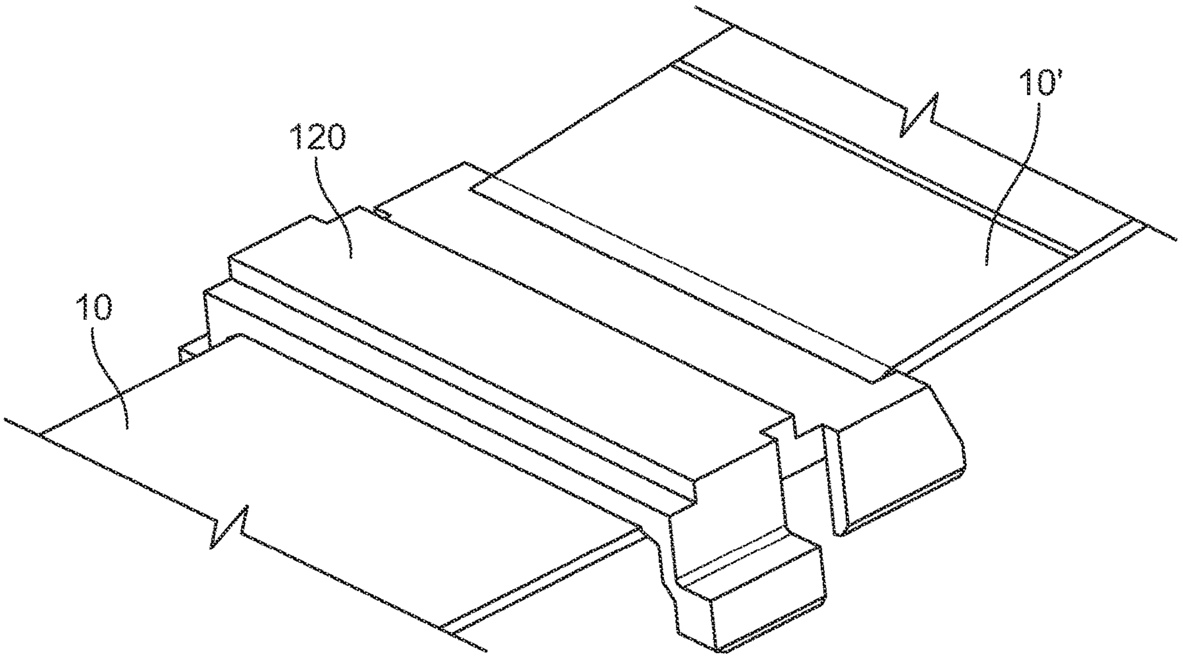
FIG. 6 is another top perspective view of a cable a subassembly according to another embodiment of the present disclosure.

As shown in FIGS. 1-5, in one embodiment, the FFC 10 and cable stiffening element or cable stiffener 120 form a so-called cable end configuration, wherein the FFC 10 is terminated at the FFC connector assembly 100. In distinction, FIG. 6 illustrates an alternate so-called daisy chain embodiment, wherein the FFC 10 (or a second FFC 10' connected thereto) extends past the cable stiffening element or cable stiffener 120, and thus the FFC connector assembly 100, wherein it can be routed to additional downstream components. The daisy chain configuration may be achieved by connecting the conductors of the two FFCs 10,10' together (e.g., via welding). In other embodiments, the conductors 12 of a single FFC 10 may be exposed in an area intermediate along its length for connecting to the terminals 180 via the cable stiffening element or cable stiffener 120 and plug 140, and a remaining portion of the FFC 10 may extend past (i.e., over) the FFC connector assembly 100 shown in FIGS. 1-3 for downstream use.

Figure 7:
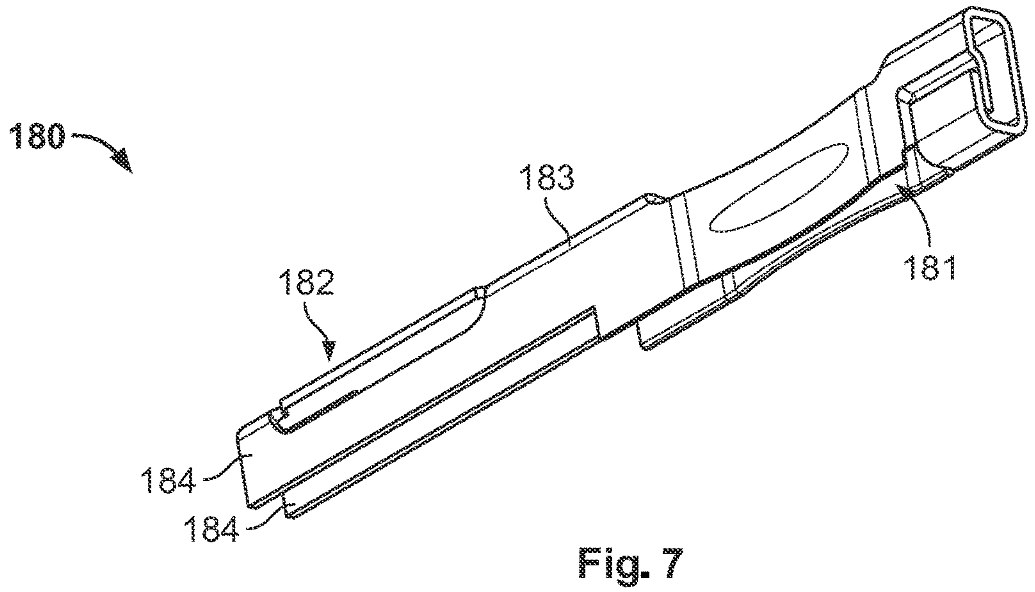
FIG. 7 is a bottom perspective view of a terminal used in the connector assembly of the preceding figures.
Figure 8:
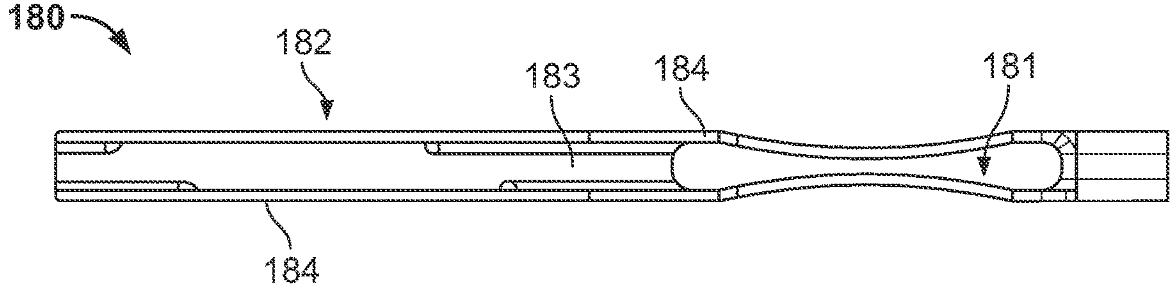
FIG. 8 is a top view of the terminal of FIG. 7.
Figure 9:
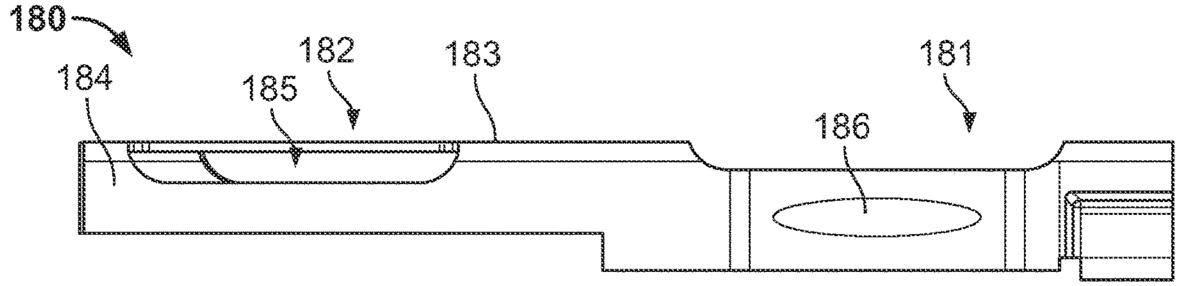
FIG. 9 is a side view of the terminal of FIG. 8.

Referring to FIGS. 7-9, the exemplary terminal 180 according to an embodiment of the present disclosure defines a slotted contact area 181 adapted to receive the conductive header tab or contact 190 therein or therethrough, and a weld area 182 adapted to be electrically connected to the exposed conductor 12 of the FFC 10. More specifically, the terminal 180 may comprises a generally inverted U-shaped cross-section including a top wall 183 and two generally parallel side walls 184 extending perpendicularly from the top wall. The weld area 182 comprises a generally planar surface defined on the top wall 183. As shown in FIG. 9, an area directly under the weld area 182 defines a void space 185.

As can be visualized from the figures, the terminal 180 may be formed by a combination of sheet metal forming operations, such as stamping and bending. Stamping the area ultimately defining the side walls 184 adjacent the weld area 182 is used to effectively widen the weld area. Likewise, stamping the area corresponding to the top wall 183 is used to form the slotted contact area 181. Each of the side walls 184 may be bent inward toward an axis center of the terminal in the contact area 181 in order to assert adequate elastic tension or normal force on an inserted conductive header tab or contact 190. In some embodiments, an inward facing, raised contact protrusion 186 may be formed on each of the side walls 184 to provide further engagement force on the conductive header tab or contact 190. In any embodiment, the terminal 180 and contact area 181 are adapted to generate sufficient normal force to be used effectively with tin or silver plating on a mating terminal. In still other embodiments, soldering or welding may also be used to connect the terminals 180 to the corresponding conductive header tabs or contacts 190 without departing from the scope of the present disclosure.

Figure 10:
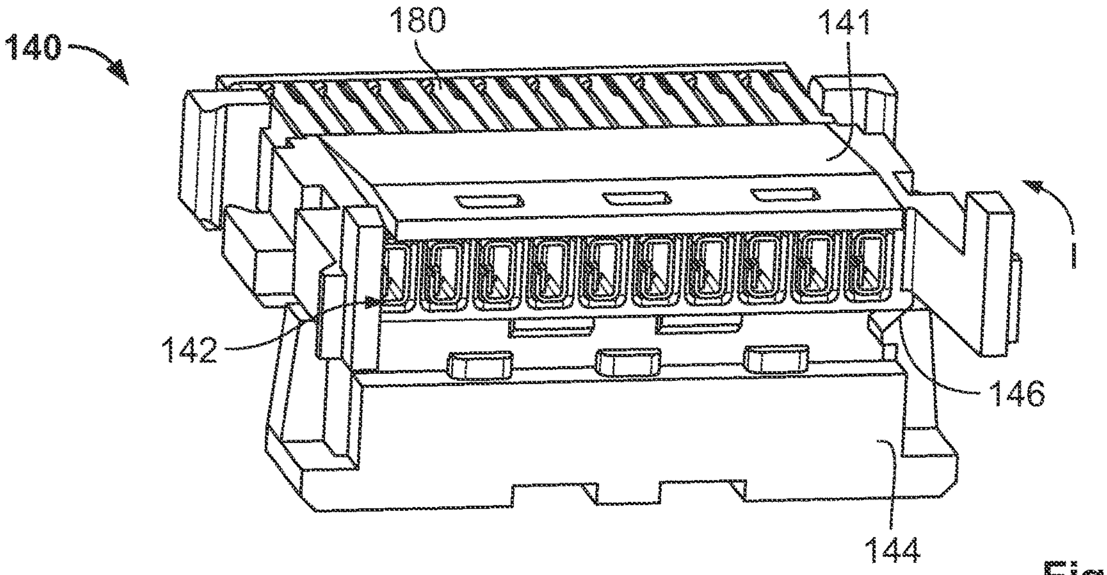
FIG. 10 is a front perspective view of a plug of the connector assembly with a terminal cover thereof in an open position and a plurality of terminals inserted therein.
Figure 11:
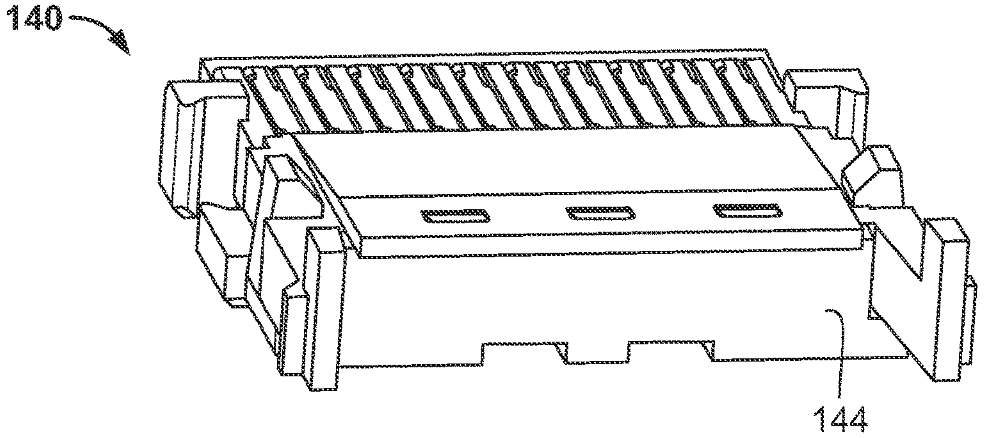
FIG. 11 is a front perspective view of the plug of FIG. 10 with the terminal cover in a closed position.

FIGS. 10-13 illustrate the plug 140 with the terminals 180 inserted therein. Specifically, as shown in FIG. 10, the plug 140 includes a plug body 141 defining a plurality of terminal openings 142. The terminals 180 are inserted into the openings 142 in an insertion direction I. Once inserted, a slidable cover 144 may be translated vertically, engaging latching elements 146 thereof with the plug body 141 to secure the cover in a closed position, as shown in FIG. 11.

Figure 12:
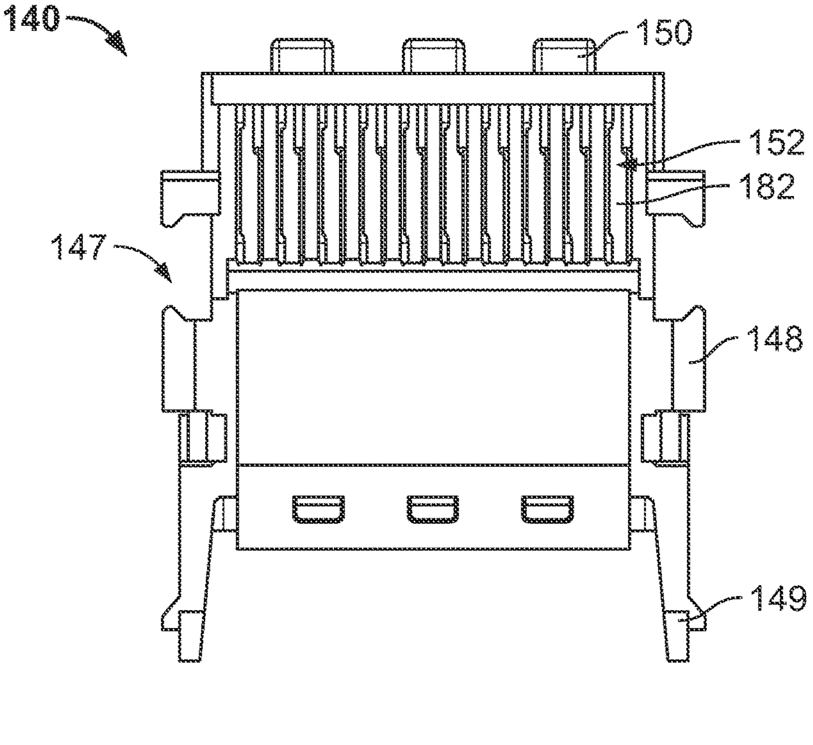
FIG. 12 is a top view of the plug of FIG. 11.
Figure 13:
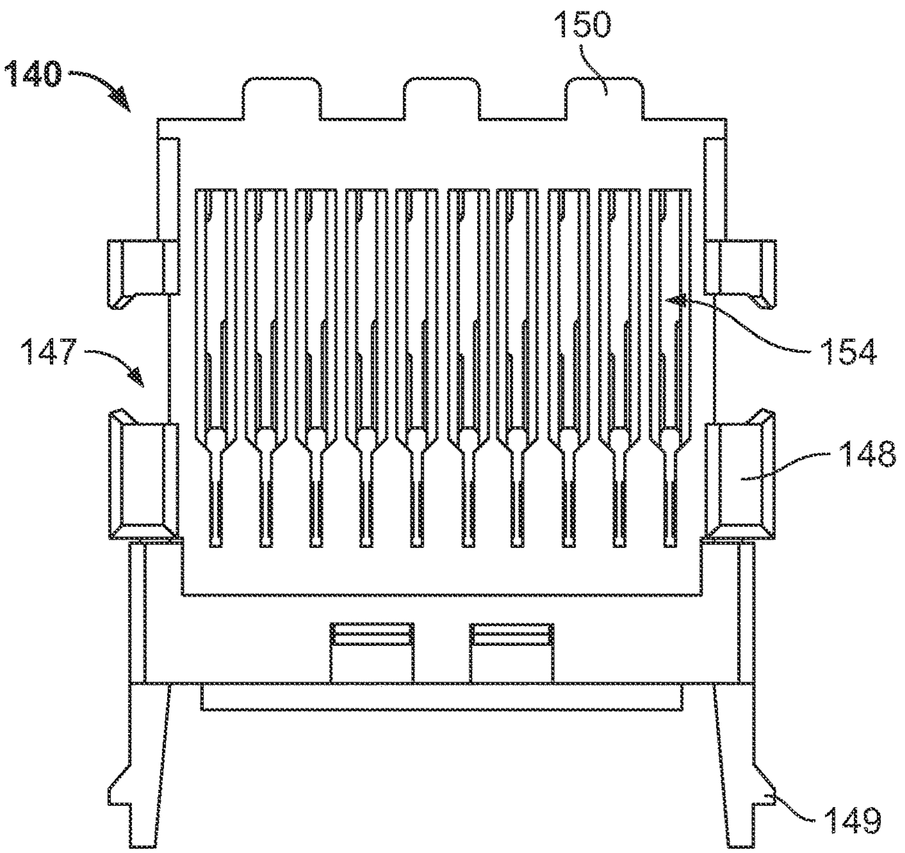
FIG. 13 is a bottom view of the plug of FIG. 11.

Referring to FIGS. 12 and 13, the plug body 141 further defines mating slots 147 and retention tabs 148 for aligning the plug 140 relative to the header 160 and/or the cable stiffening element or cable stiffener 120. Primary elastic primary latches 149 and retention pegs 150 are adapted to secure the plug 140 in a locked position after mating with the header 160, as will be described in detail herein. A top wall of the plug body 141 shown in FIG. 12 defines weld tab openings 152 through which the weld areas 182 of the terminals 180 are exposed on the cable-side of the plug 140. As shown in FIG. 13, a bottom side of the plug 140 defines a plurality of weld windows 154 through which the underside of the weld areas 182 of the terminals 180 are exposed and may be welded to the conductors 12 of the FFC 10.

Figure 14:
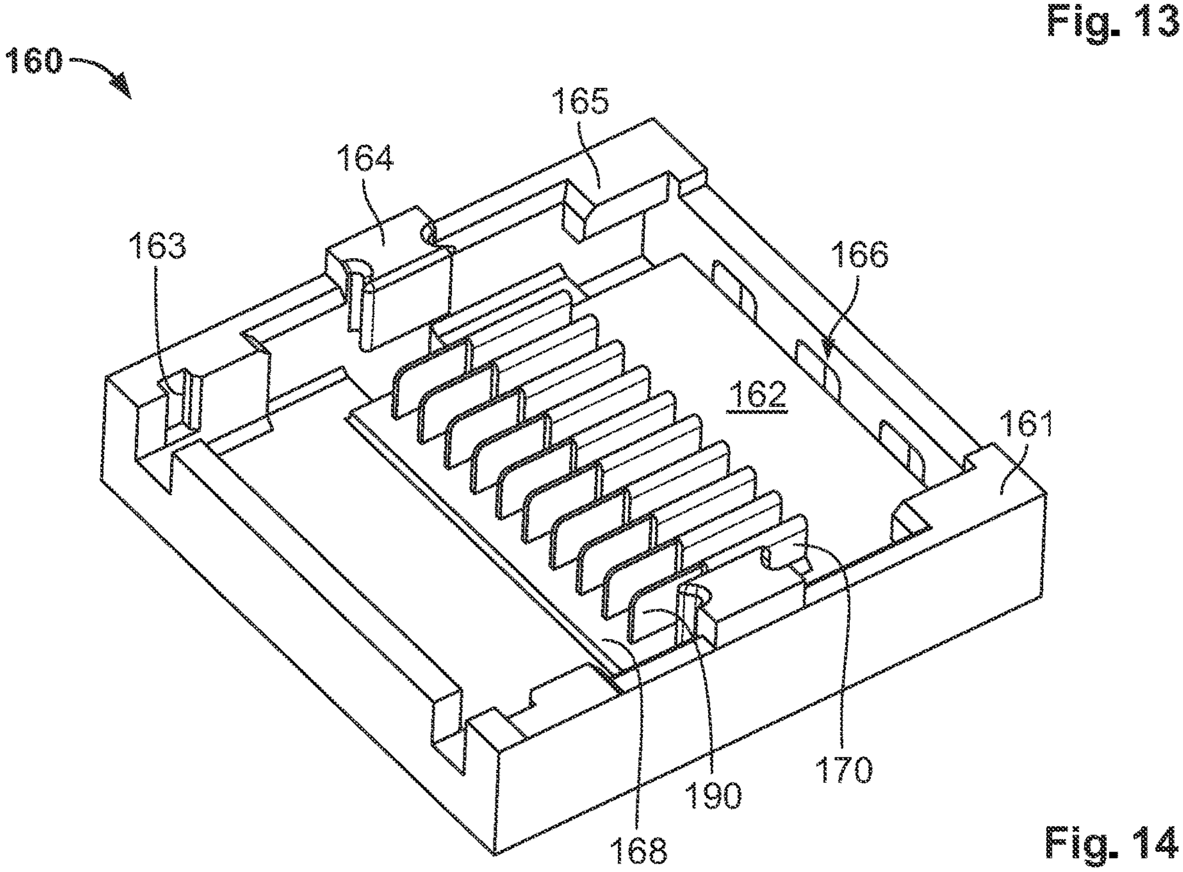
FIG. 14 is a top perspective view of a header of the connector assembly of the preceding figures.

FIG. 14 provides a detailed view of the header 160. The header 160 includes a header body 161 defining a primary plug opening 162 sized and shaped to receive the plug 140 therein. The header body 161 defines plug latch detents 163 adapted to engage with the primary latches 149 of the plug 140 with the plug in an installed position within the header 160. Plug retention tabs 164,165 and retention holes 166 are defined by the header body 161 and in communication with the plug opening 162 for engaging with the plug 140 as it is moved through an insertion and locking process, as described herein.

Figure 15:
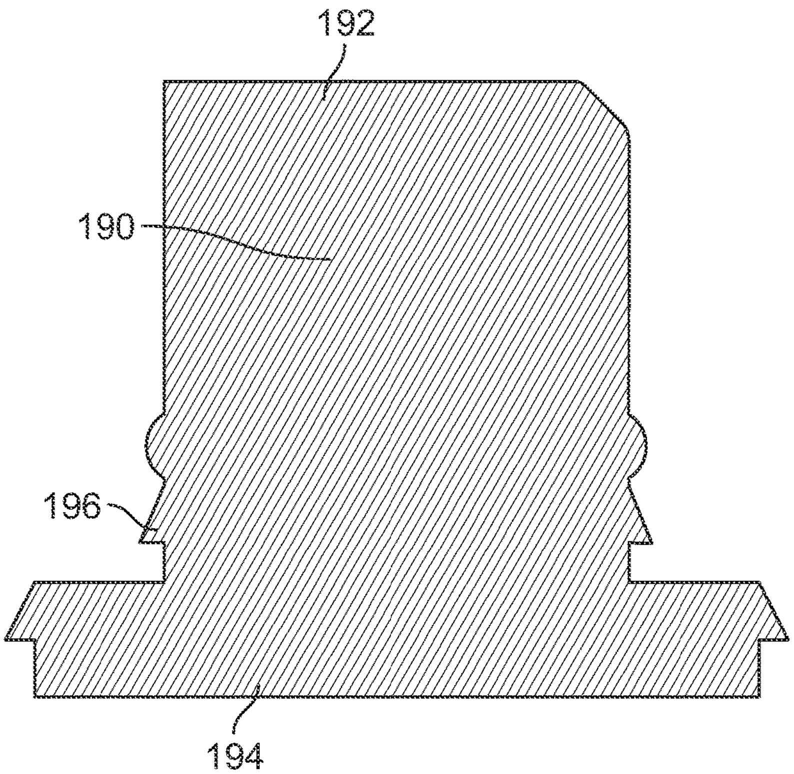
FIG. 15 is a side view of an exemplary header contact used in the header of FIG. 14.

Still referring to FIG. 14, as well as to FIG. 15, the plurality of conductive header tabs or contacts 190 have a blade-shape and include a mating end 192 adapted to engage with the contact areas 181 of each of the terminals 180, and a contact end 194 adapted to mate with and be electrically connected to, for example, conductors formed on a substate, such as a PCB. A plurality of teeth 196 may be formed on edges of the conductive header tab or contact 190 for engaging with the header body 161 in order to retain it within the header 160. Specifically, as shown in FIG. 14, each conductive header tab or contact 190 may be inserted through an opening in a bottom wall 168 of the header body 161 with an interference or press fit such that the mating end 192 thereof is arranged within the plug opening 162. The header body 161 may also define a plurality of contact or tab protection fins or protrusions 170 protruding from the bottom wall 168 and axially aligning with the conductive header tabs or contacts 190. The protection fins 170 are adapted to prevent damage (e.g., bending or flattening) of the conductive header tabs or contacts 190 in the event the plug 140 is attempted to be inserted into the plug opening 162 of the header 160 in a misaligned manner.

Figure 16:
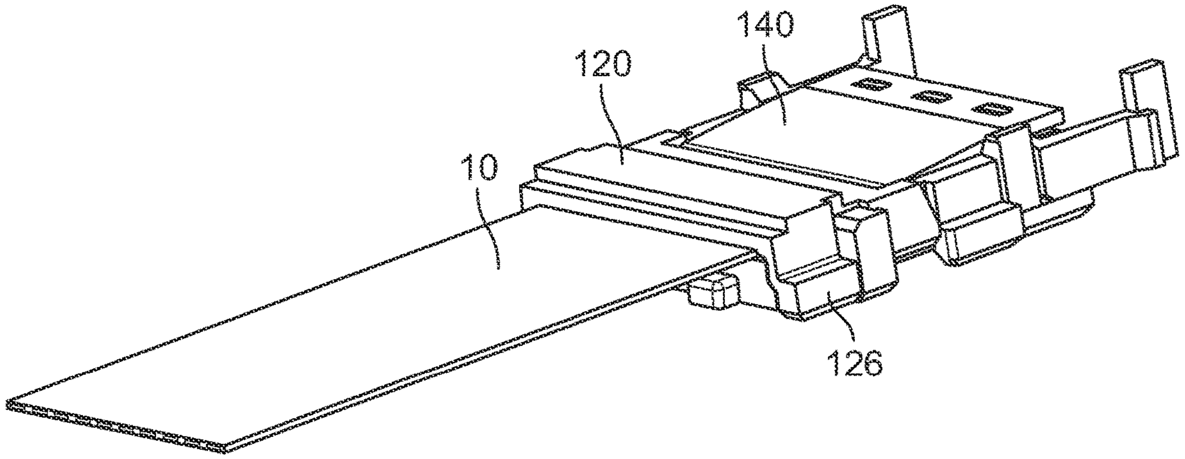
FIG. 16 is a rear perspective view of the cable subassembly of FIG. 4 mated with the plug of FIG. 11.
Figure 17:
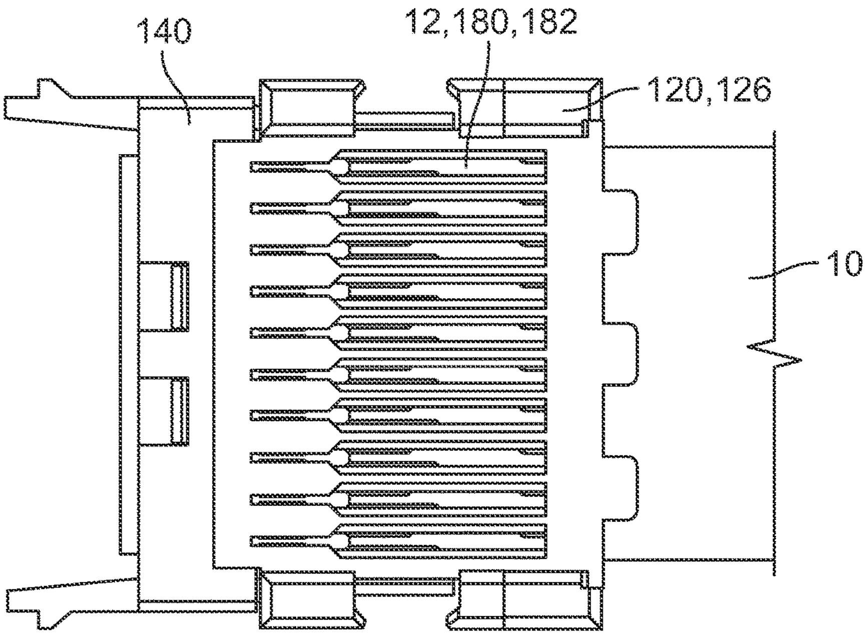
FIG. 17 is a bottom view of the assembly of FIG. 16.

Referring now to FIGS. 16-23, a process for constructing the FFC connector assembly 100 is provided. As shown in FIG. 16, with the cable stiffening element or cable stiffener 120 fixed to the FFC 10 (e.g., via adhesive), the FFC and stiffening element is fitted to the plug 140. Specifically, the latching arms 126 of the stiffening element or cable stiffener 120 is snap-fit over the plug 140 such that the exposed conductors 12 of the FFC 10 are opposed to or directly adjacent the weld areas 182 of the terminals 180. As shown in FIG. 17, from the underside of the plug 140, the conductors 12 and terminals 180 are welded within the windows, for example, by laser welding. In one embodiment, this target weld area 182 is at least 3 mm in an axial direction of each terminal 180 and/or conductor 12.

Figure 18:
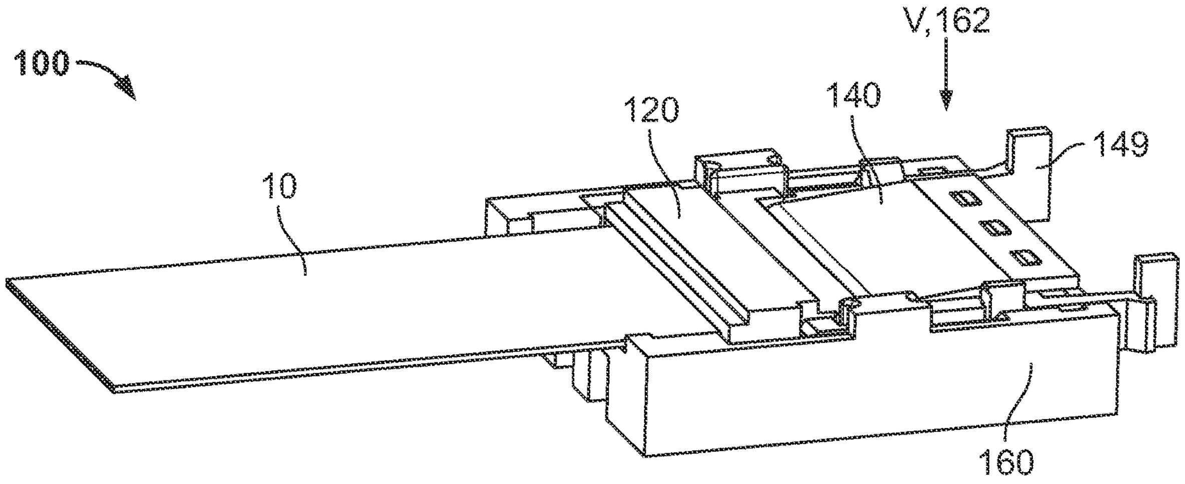
FIG. 18 is a side perspective view of the cable assembly of FIG. 1 in an initial mating position.
Figure 19:
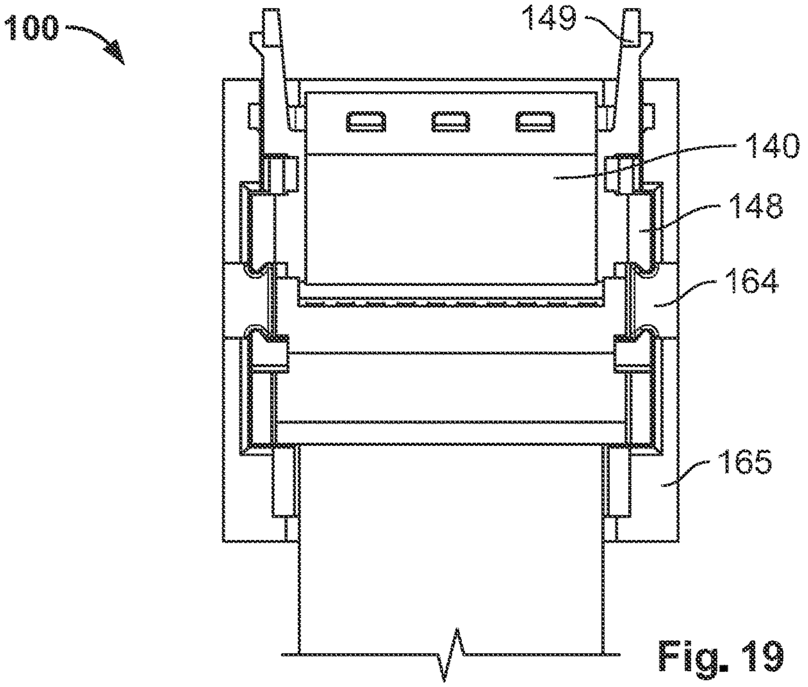
FIG. 19 is a top view of the cable assembly of FIG. 18.
Figure 20:
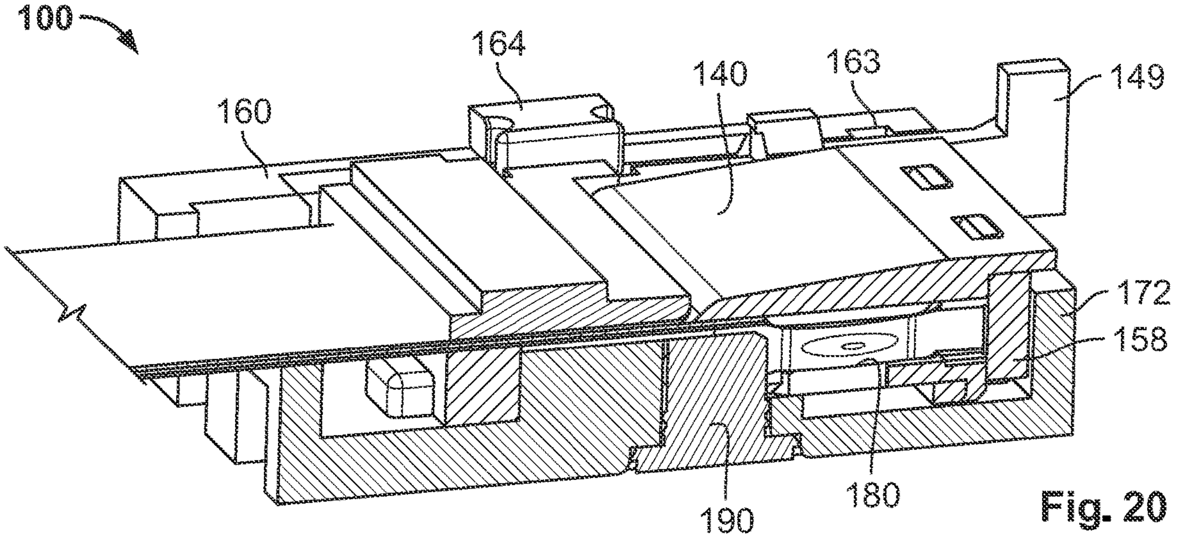
FIG. 20 is a side cross-sectional view of the cable assembly of FIGS. 18 and 19.

With respect to FIGS. 18-20, with the plug 140 and cable 10 assembled and welded, the plug 140 is aligned vertically over the header 160 in a first position (i.e., aligned as shown in FIG. 3), and inserting into the plug opening 162 of the header 160 in the indicated downward vertical direction guided by the retention tabs 148 of the plug 140, and corresponding portions of the cable stiffening element 120 are slid under the corresponding retention tabs 164,165 of the header 160. As the plug 140 is inserted into the header 160, the conductive header tabs or contacts 190 are received within the slot 181 defined in the bottom of each terminal 180. In this position, the plug 140 and header 160 have not formed conductive connections, or at least suitable strong connections, between the terminals 180 and conductive header tabs or contacts 190. As best seen in FIG. 20, in this initial inserted or connected state, a front end 158 of the plug 140 is aligned with a front wall 172 of the plug opening 162, and the primary elastic plug latches 149 have not engaged with the header detents 163.

Figure 21:
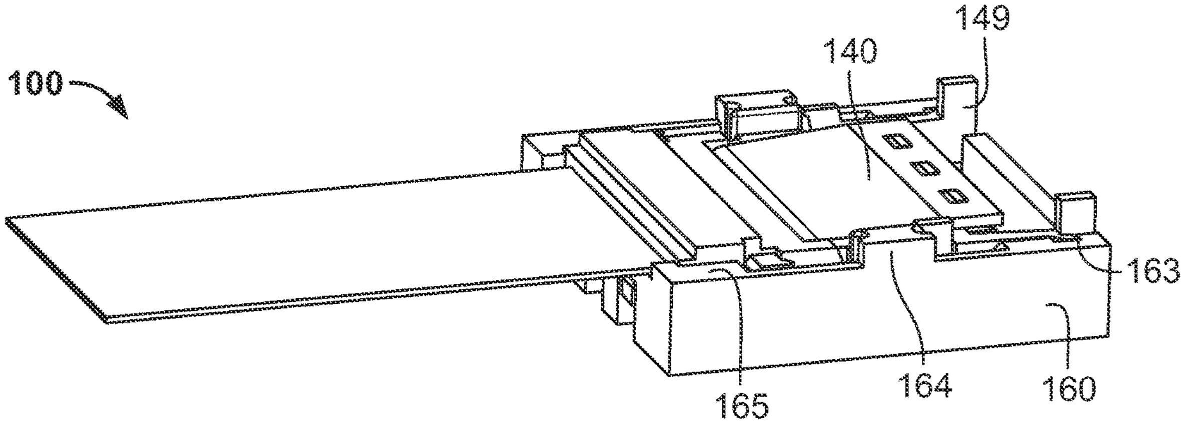
FIG. 21 is a side perspective view of the cable assembly of FIG. 1 in a final mating position.
Figure 22:
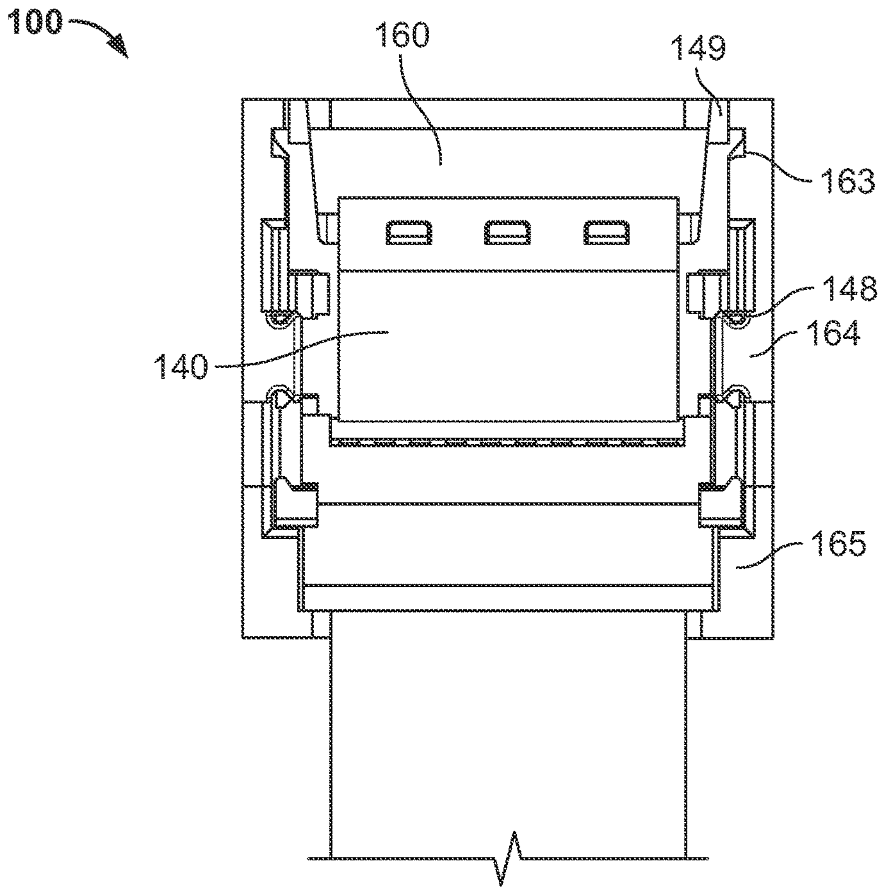
FIG. 22 is a top view of the cable assembly of FIG. 21.
Figure 23:
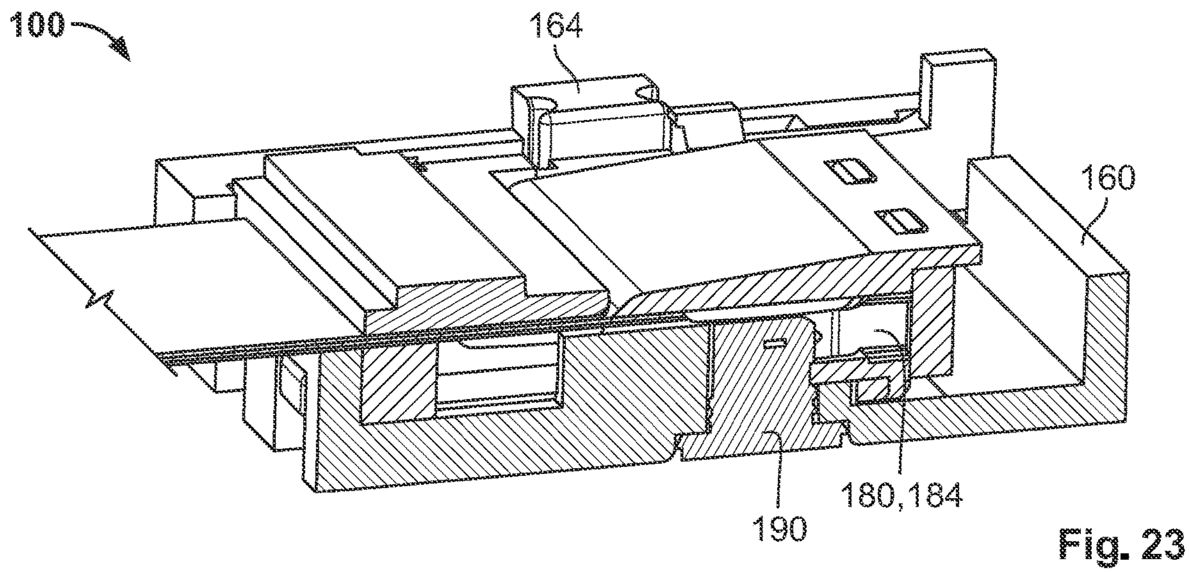
FIG. 23 is a side cross-sectional view of the cable assembly of FIGS. 21 and 22.

FIGS. 21-23 illustrate a final mating step. Specifically, by biasing the plug 140 rearward relative to the header 160, the plug retention tabs 148 of the plug 140, and corresponding portions of the cable stiffening element or cable stiffener 120 are slid under the corresponding retention tabs 164,165 of the header 160. After sufficient motion (e.g., at least 3 mm), the primary elastic plug latches 149 engage with the header detents 163 of the header 160, locking the plug 140 into the illustrated final, rearward position. As shown most clearly in FIG. 23, each of the conductive header tabs or contacts 190 has been moved into the contact areas 181 of the terminals 180, biasing the side walls 184 thereof elastically outward, generating a contact force on the contact tabs, thus ensuring reliable, low resistance conductive contact therebetween.

In order to release the plug 140 and FFC 10 from the header 160, the primary plug latches 149 must be released from the header detents 163, and the plug 140 slid forward and out from under the retention tabs 164,165, thereby freeing the plug 140 to be removed vertically upward from the header 160.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector assembly for a flat flexible cable (FFC), comprising:
- a header, including
  - a plug opening; and
  - a plurality of conductive contacts arranged within the plug opening; and
- a plug containing a plurality of conductive terminals therein, the plug defining:
  - a plurality of first openings defined on a first side of the plug and exposing a weld area of each of the plurality of conductive terminals for electrically connecting each of the plurality of conductive terminals to an exposed conductor of the FFC; and
  - a second plurality of second openings defined on a second side of the plug and exposing a contact area of each of the plurality of conductive terminals for electrically engaging with a respective one of the conductive contacts of the header with the plug connected to the header within the plug opening.

2. The connector assembly of claim 1, wherein:
- the plug is insertable into the plug opening of the header in a first direction to an initial position; and
- from the initial position, the plug is translatable in a second direction, distinct from the first direction, into a final position wherein the contact area of each of the plurality of conductive terminals engages with a respective one of the plurality of conductive contacts of the header.

3. The connector assembly of claim 2, wherein in the final position, the plug is mechanically fixed within the the plug opening of the header and prevented from motion in at least three mutually perpendicular directions.

4. The connector assembly of claim 2, wherein the plug is fixed in the final position by at least one latch.

5. The connector assembly of claim 2, wherein each of the plurality of conductive terminals defines a slot, the slot having a narrowing width within the contact area.

6. The connector assembly of claim 5, wherein each of the conductive contacts of the header defines a conductive tab received within the slot of a respective one of the plurality of conductive terminals, the conductive tab engaging with the contact area of the terminal as the plug is biased into the final position.

7. The connector assembly of claim 6, wherein the header further comprises a plurality of protection fins axially aligned with a respective one of the conductive tabs and extending vertically into the plug opening.

8. The connector assembly of claim 7, wherein with the plug in the initial position, the conductive contacts of the header and the protection fins are arranged within the slots defined by the plurality of conductive terminals.

9. The connector assembly of claim 2, further comprising a cable stiffening element adapted to be fixed to the stiffening element attached to the plug in a position for aligning the exposed conductors of the FFC with the weld areas of the plurality of conductive terminals.

10. The connector assembly of claim 9, wherein the cable stiffening element is captured under a portion of the header with the plug in the final position.

11. The connector assembly of claim 9, wherein a side of each of the plurality of conductive terminals opposite the weld area is accessible through an underside of the plug for welding the plurality of conductive terminals to the conductors of the FFC.

12. The connector assembly of claim 2, wherein the initial position, the conductive contacts of the header are not in conductive contact with the plurality of conductive terminals of the plug.

13. The connector assembly of claim 1, wherein the conductive contacts of the header extend through a bottom wall of the header for electrically connecting to a substrate on which the header is mounted.

14. A connector assembly for a flat flexible cable (FFC), comprising:

a plug retaining a plurality of conductive terminals, each of the plurality of conductive terminals having a welding surface exposed on a first side of the plug having a first contact surface, and a second contact surface exposed on a second side of the plug, opposite the first side;

the FFC including a plurality of conductors exposed on at least one side thereof;

a cable stiffening element arranged over the FFC proximate the plurality of exposed conductors, the cable stiffening element mounted to the plug such that the welding surfaces of the plurality of conductive terminals oppose the exposed conductors of the FFC; and a header adapted to be mounted to a substrate and defining a plug opening having a plurality of conductive header contacts arranged therein, the plug connectable to the header within the plug opening with the second contact surfaces of the plurality of conductive terminals in conductive contact with respective ones of the plurality of header contacts.

15. The connector assembly of claim 14, wherein the plug is insertable into the plug opening of the header in an insertion direction to an initial position wherein the header contacts are not in conductive contact with the plurality of conductive terminals of the plug.

16. The connector assembly of claim 15, wherein the plug is slidable within the plug opening from the initial position to a final position, in the final position the header contacts engaging with the plurality of conductive terminals of the plug for establishing an electrical connection therewith.

17. The connector assembly of claim 16, further comprising:

a latch for fixing the plug in the final position within the plug opening; and a plurality of retention elements opposing motion of the cable stiffening element and the plug in a direction opposite the insertion direction with the plug in the final position.

18. The connector assembly of claim 14, wherein each of the exposed conductors of the FFC are welded to a respective one of the plurality of conductive terminals from a side of the terminal opposite the welding surface.

19. The connector assembly of claim 14, wherein each of the plurality of conductive terminals defines a slot having a narrowed portion of decreasing width, each of the header contacts biased into the narrowed portion of the slot as the plug is moved from the initial position to the final position.

20. The connector assembly of claim 19, wherein the header further comprises a plurality of protection fins axially aligned with a respective one of the header contacts and extending vertically into the plug opening.

* * * * *